Jan. 3, 1956     R. M. RANSIER ET AL     2,729,789
GALVANOMETER

INVENTOR.
R. M. RANSIER
G. B. WAY
BY Hudson & Young
ATTORNEYS

INVENTOR.
R. M. RANSIER
G. B. WAY
BY Hudson & Young
ATTORNEYS

United States Patent Office 2,729,789
Patented Jan. 3, 1956

2,729,789
GALVANOMETER

Robert M. Ransier and Garold B. Way, Bartlesville, Okla., assignors to Phillips Petroleum Company, a corporation of Delaware Application September 18, 1950, Serial No. 185,356

5 Claims. (Cl. 324—147)

This invention relates to galvanometers.

Heretofore, it has been extremely difficult to provide a galvanometer which will support and operate a large mirror, which will not become readily overloaded, and in which the zero setting of the galvanometer is not changed by rough handling or ordinary usage. In addition, difficulties have been encountered in changing the natural frequency of the galvanometer and in providing effective damping thereof.

It is an object of this invention to overcome such difficulties previously encountered with galvanometers.

It is a further object to provide a galvanometer which is rugged in construction, reliable in operation, and which can handle a large amount of power without damage to the instrument.

It is a still further object to provide a galvanometer of simple construction in which the zero setting can be readily changed and maintained in an adjusted setting despite rough usage or handling.

It is a still further object to provide a galvanometer in which the electrical impedance and natural frequency can be readily changed and which will support and operate a large mirror.

It is a still further object to provide a galvanometer which can be effectively sealed and in which oil can be used as the damping element.

Various other objects, advantages and features of the invention will become apparent from the following detailed description taken in conjunction with the accompanying drawings, in which.

Figure 1:
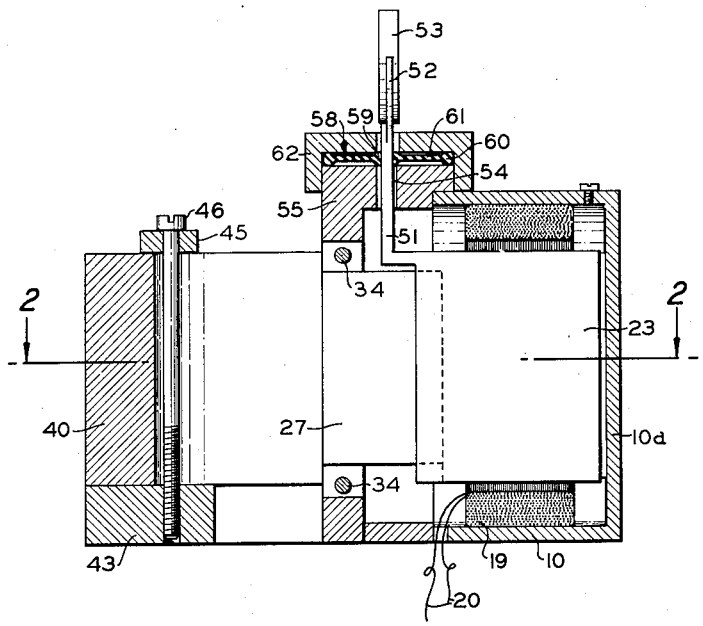
Figure 1 is a vertical sectional view of the galvanometer of our invention.

Referring now to the drawings in detail, the galvanometer includes a housing 10 adapted to be closed by a bottom plate 10a. The housing is of generally rectangular shape and is adapted to receive, along the opposite elongated sides thereof, a pair of plate members 11 and 12 formed from magnetic material and provided, respectively, with two sets 13, 14 and 15, 16 of longitudinal flanges. When the plates 11 and 12 are secured in housing 10, as by bolts 18, the two sets of flanges are disposed in closely adjacent parallel relationship, thereby to define two sets of pole pieces, the members of each set being separated by an air gap.

An annular elongated coil 19 is received between the two sets of flanges, the leads 20 of the coil extending through a suitable sealed junction, not shown, in the housing and adapted for connection to a source of electrical signal energy for actuating the galvanometer.

An armature 22 is adapted to fit within the annular opening in coil 19, this armature including a thin flat plate 23 of magnetic material having a slot 24 formed in an edge 25 thereof. A flexible plate 27 of resilient spring material has one edge 28 thereof disposed within the slot 24 and secured to the edge portions 25 defining the slot, as by welding or brazing. The opposite edge 29 of plate 27 extends through a slot 30 formed in a non-magnetic top plate 31, the edge portion 29 fitting between an elongated clamping surface 32 of the plate 31 and a complementary clamping surface formed on a plate 33 which can be secured in clamping arrangement with the surface 32 by bolts 34. Thus, one edge 29 of hinge plate 27 is clamped between the surfaces of members 32 and 33 while its opposite edge 28 is secured to the plate 22 and thereby supports the same by a flexible hinged support for movement within the annular opening in coil 19 between the two sets 13, 15 and 14, 16 of pole pieces defined by the plates 11 and 12. It will be noted that the plate 31 can be clamped or secured to housing 10 by bolts 35, extending through openings 36 in plate 31 and openings 37 formed in suitable flanged webs 38 of the housing 10.

Figure 2:
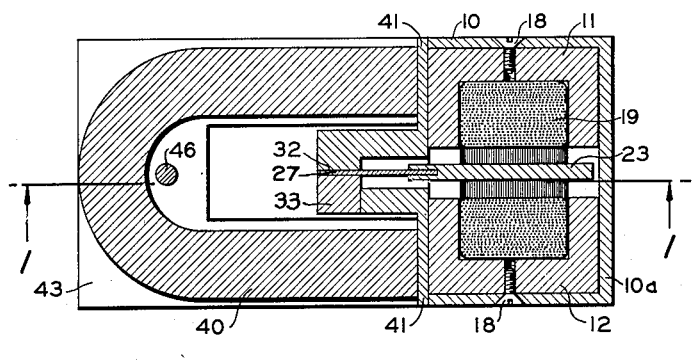
Figure 2 is a sectional view taken along the line 2—2 of Figure 1.
Figure 3:
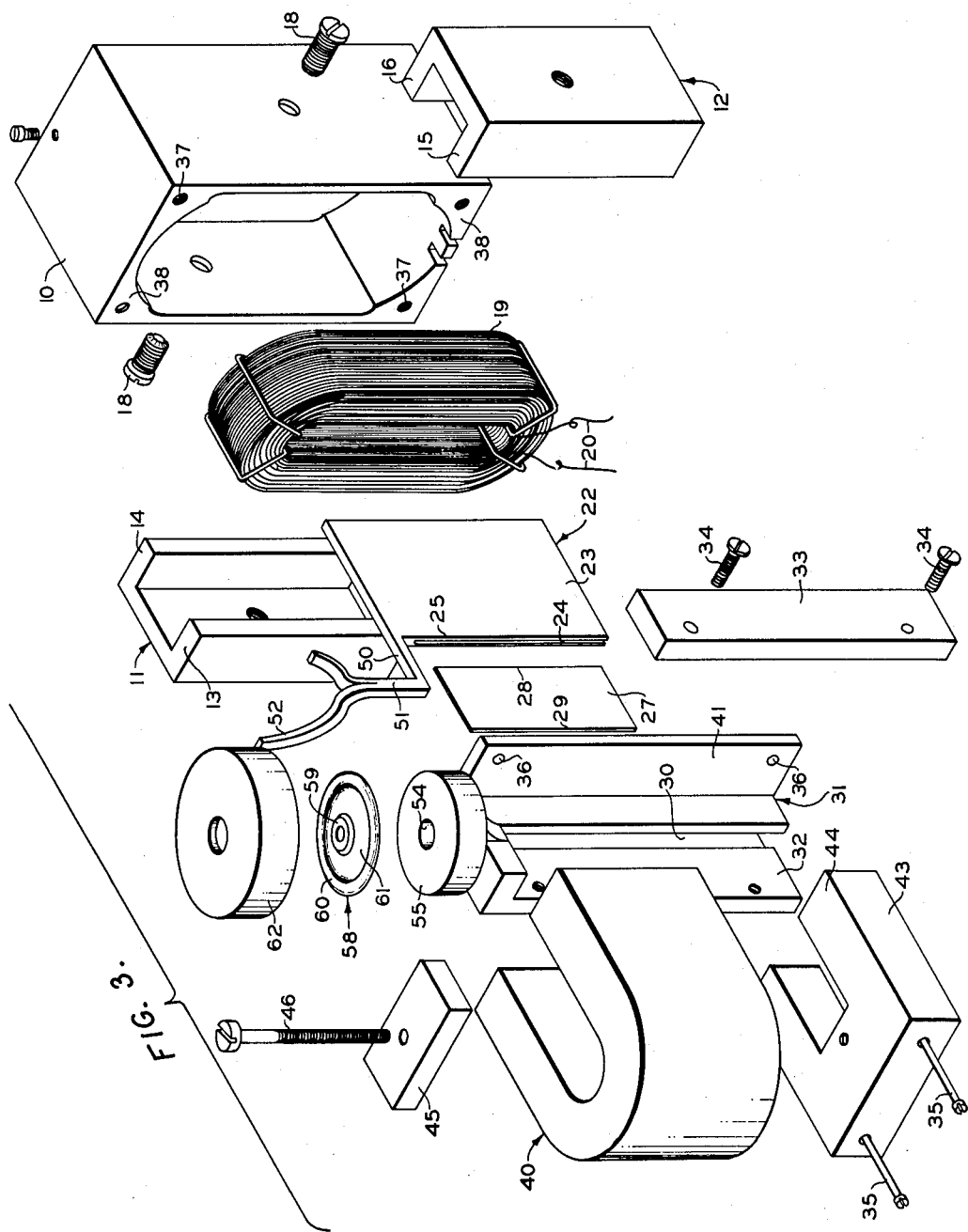
Figure 3 is a perspective view of the galvanometer with the parts in disassembled relation.

A U-shape or horseshoe type permanent magnet 40 is adapted to engage upon laterally extending portions 41, Figure 2, of plate 31, the legs of the magnet being clamped into engagement therewith by a structure including a slotted non-magnetic clamping block 43 secured to the portions 41 by the bolts 35, the inner surface 44 of this block being adapted to engage one side of the magnet 40. A clamping piece 45 is engageable with the other side of the magnet 40 and this piece can be secured to block 43 by a screw 46 so as to firmly hold the magnet 40 in its desired position against the portions 41 of plate 31. It will be noted, however, that the magnet 40 can be moved laterally when the members 43, 45 are disengaged from the sides thereof, thereby providing a centering adjustment for the armature to be more fully described hereinafter.

Protruding from the edge 25 of plate 22 is an arm 50 having a bent end portion 51 terminating in a split or cradled portion 52 which carries a mirror 53, Figure 1. The bent portion 51 extends through an opening 54 in a cylindrical boss or clamping member 55 which can be either integrally formed with or secured to the plate assembly 31. A resilient gasket 58 has an enlarged central portion or rib 59 mounted in sealing engagement with the bent end portion 51, the gasket also including an enlarged circumferential rib or ring 60 secured to the central portion 59 by a thin web 61. A cylindrical clamping member 62 fits over the gasket and the boss 55 to urge the ring 60 into sealing engagement with the boss 55 and also to urge the enlarged central portion 59 into sealing engagement with the boss 55 adjacent the passage 54. This structure provides effective sealing of the housing at the region where the bent arm portion 51 passes therethrough without, however, interfering with rotary movement of this arm responsive to deflection of the armature as hereinafter described.

When the bottom plate 10a is secured to the housing 10, it will be seen that a sealed enclosure is provided within which are mounted the pole pieces or plates 11, 12, the coil 19 and the armature structure 22. This enclosure is preferably filled with a viscous fluid, such as oil or a silicone fluid, to provide damping for the galvanometer, the extent of damping depending upon the viscosity of the oil. If desired, the magnet 40 and associated structure may also be mounted within a suitable enclosure, not shown.

The operation of the galvanometer will now be apparent to those skilled in the art. When the parts are assembled in the manner indicated by Figures 1 and 2, the armature plate 23 is hingedly mounted between the two sets 13, 15 and 14, 16 of pole pieces and extends through the annular opening in coil 19. The magnet 40, the legs of which are positioned adjacent the respective flanges 13 and 15, provides a magnetic field between the two sets of pole pieces, although this field can be provided by means other than a permanent magnet in certain broader aspects of the invention. As a result, when a signal current is applied to coil 19, the plate 23 is deflected, thereby producing a rotation of bent arm portion 51 which is positioned substantially at the axis of the armature assembly, this rotation producing a corresponding movement of the mirror 53 which can, for example, be arranged to deflect a beam of light upon a recorder tape or chart.

The described construction affords a number of important advantages. The novel sealing gasket 58 in combination with the bent portion 51 and cylindrical members 55, 62 permits the interior of housing 10 to be readily sealed and filled with a viscous liquid to provide damping for the galvanometer. Due to the provision of the thin web 61 between the outer and inner enlarged portions of the gasket, this effective sealing action is obtained without interfering with the rotary movement of arm portion 51 and mirror 53 responsive to deflection of the armature. Resilient hinge plate 27 together with the associated structure of plate 31 are such that overloading of the galvanometer merely forces the armature against one side or the other of coil 19 without damaging the armature or other parts. Furthermore, the elongated plate provides sufficient energy to move a large mirror in suitable manner to properly actuate a recording beam. Finally, the galvanometer can withstand rough handling without damage due to the provision of the elongated spring plates and armature. This results to a large extent from the fact that the coil is permanently mounted and does not move responsive to the signal voltages applied to the galvanometer.

It will be noted that the impedance of the galvanometer can be readily changed by varying the number of turns or type of wire in the winding of coil 19 so, for example, as to match the output of a power output tube in an amplifier circuit. The damping of the galvanometer can be readily changed by varying the viscosity of the oil or other fluid maintained within the housing 10. Finally, the natural frequency of the galvanometer can be varied by changing the thickness or spring constant of the hinge plate 27.

It is a further feature of the invention that magnet 40 can be moved laterally to provide a zero adjustment for the galvanometer. As stated, when the clamping members 43, 45 are disengaged, the magnet can be moved a short distance laterally with respect to the plates 41. This changes the intensity and character of the magnetic field produced between the sets 13, 15 and 14, 16 of pole pieces in such fashion that a relatively large lateral movement of the magnet produces a relatively small lateral movement of the armature plate 33. In this manner, very sensitive zero adjustment is obtained and this zero adjustment is not disturbed by handling of the galvanometer once the magnet 40 has been clamped in its desired position by the members 43 and 45. Further, a very small permanent magnet can be used and this magnet is mounted outside the sealed housing so that it can be readily adjusted or replaced.

While the invention has been described in connection with present, preferred embodiments thereof, it is to be understood that this description is illustrative only and is not intended to limit the invention, the scope of which is defined by the appended claims.

We claim:

1. A galvanometer comprising, in combination, a housing having an opening therein, a pair of plates of magnetic material disposed at opposite sides of said housing, each plate having a pair of flanges, thereby defining two sets of spaced pole pieces, a coil mounted between the flanged portions of said plates to vary a magnetic field therebetween in accordance with an electrical signal input, an armature comprising a flat plate of magnetic material having a slot formed in one edge thereof, a resilient metal hinge plate having one edge thereof secured to said housing and an opposite edge fitted within said slot and secured to the portions of said flat plate defining said slot, an arm protruding from said edge of the flat plate and having a bent portion extending through said opening, said bent portion having a mirror-supporting cradle formed exteriorly of said housing in substantial alignment with the axis of rotation of said hinge plate, a gasket sealing the region between said arm and said housing in the neighborhood of said opening, a magnet for establishing a magnetic field between said sets of pole pieces, and means for detachably securing said magnet to said housing whereby the magnet is movable upon disengagement of said securing means to permit variation of the magnetic field between said sets of pole pieces, thereby to permit centering of said armature.

2. A galvanometer comprising, in combination, a housing having an opening therein, a pair of plates of magnetic material disposed at opposite sides of said housing, each plate having a pair of flanges, thereby defining two sets of spaced pole pieces, a coil mounted between the flanged portions of said plates to vary a magnetic field therebetween in accordance with an electrical signal input, an armature comprising a flat plate of magnetic material mounted between said pole pieces, an arm integrally formed with and protruding from one edge of said flat plate, said arm having a bent portion extending through said opening, a mirror carried by said bent portion exteriorly of said housing in substantial alignment with the axis of rotation of said flat plate, an annular flexible sealing gasket having a central rib in sealing engagement with said arm and a circumferential rib connected by a thin portion with said central rib, a pair of generally cylindrical clamping members for sealing the region between the peripheral rib of said gasket and said housing, a magnet for establishing a magnetic field between said sets of pole pieces, a first clamping plate secured to said housing and engageable with a side of said magnet, and a second clamping plate detachably secured to said first clamping plate and adapted to bear against the other side of said magnet.

3. A galvanometer constructed in accordance with claim 2 in which the housing is filled with oil, the viscosity of said oil determining the damping coefficient of the galvanometer.

4. A galvanometer comprising, in combination, a housing having an opening therein, a pair of plates of magnetic material disposed at opposite sides of said housing, each plate having a pair of flanges, thereby defining two sets of spaced pole pieces, a coil mounted between the flanged portions of said pair of plates to vary a magnetic field therebetween in accordance with an electrical signal input, an armature comprising a plate of magnetic material mounted between said pole pieces, an arm integrally formed with and protruding from one edge of said plate of magnetic material, said arm having a bent portion extending through said opening, a mirror carried by said bent portion exteriorly of said housing in substantial alignment with the axis of rotation of said plate of magnetic material, an annular flexible sealing gasket having a central rib in sealed engagement with said arm and a circumferential rib connected by a thin portion with said central rib, a pair of generally cylindrical clamping members to seal the region between the peripheral rib of said gasket and said housing, and a magnet to establish a magnetic field between said sets of pole pieces.

5. A galvanometer comprising, in combination, a housing having an opening therein, a pair of spaced pole pieces mounted in said housing, means for establishing a magnetic field between said pole pieces, a coil mounted between said pole pieces for varying said magnetic field in accordance with an electrical signal input, an armature comprising a flat plate of magnetic material positioned between said pole pieces, a resilient plate having one edge thereof secured to said housing and the opposite edge thereof secured to said flat plate, said plate forming a hinge which is the axis of rotation of said armature, an arm integrally formed with and protruding from said flat plate in the plane of said resilient plate, said arm having a bent end portion extending laterally from the edge of said flat plate substantially to the axis of rotation of the assembly formed by said flat plate and said resilient plate, said arm then extending through said opening along said axis of rotation, and a mirror carried by said arm outside said housing, on said axis of rotation.

References Cited in the file of this patent

UNITED STATES PATENTS

| Number | Name | Date |
|---|---|---|
| 959,551 | Kintner | May 31, 1910 |
| 1,701,022 | Thornton | Feb. 5, 1929 |
| 1,807,139 | Volodimirov | May 26, 1931 |
| 1,936,833 | Dimmick | Nov. 28, 1933 |
| 1,975,280 | Lindenberg | Oct. 2, 1934 |
| 2,057,845 | Pattee | Oct. 20, 1936 |
| 2,127,427 | Scheldorf | Aug. 16, 1938 |
| 2,207,064 | Maurer | July 9, 1940 |
| 2,322,816 | Boeker | June 29, 1943 |
| 2,395,843 | Brown | Mar. 5, 1946 |
| 2,473,353 | Aust | June 14, 1949 |
| 2,484,567 | Hoare | Oct. 11, 1949 |
| 2,492,275 | Dimmick | Dec. 27, 1949 |
| 2,506,648 | Niemann et al. | May 9, 1950 |
| 2,510,585 | Kellogg | June 6, 1950 |